(No Model.)
O. V. BLAZIER.
SNAP HOOK.
No. 393,138. Patented Nov. 20, 1888.
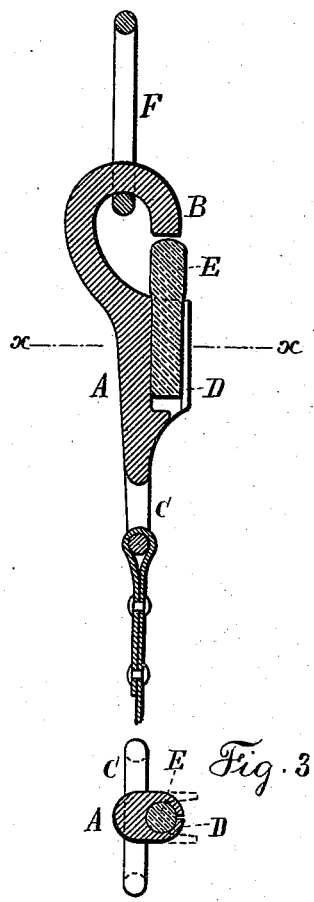
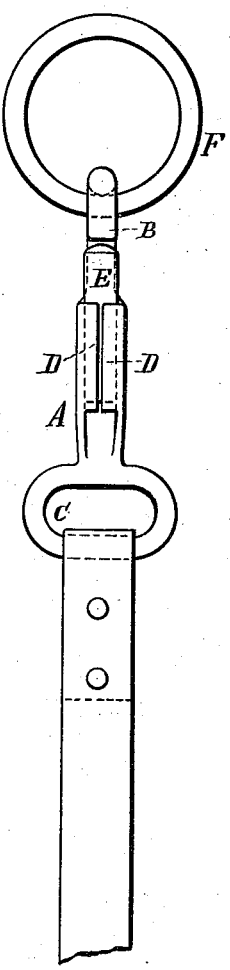
Witnesses:
J. Stait.
Chas. H. Smith
Inventor:
Oscar V. Blazier,
per Lemuel W. Serrell, Atty

UNITED STATES PATENT OFFICE.

OSCAR V. BLAZIER, OF GILLETTE, NEW JERSEY.

SNAP-HOOK.

SPECIFICATION forming part of Letters Patent No. 393,138, dated November 20, 1888.

Application filed August 18, 1888. Serial No. 283,148. (No model.)

*To all whom it may concern:*

Be it known that I, OSCAR V. BLAZIER, of Gillette, in the county of Morris and State of New Jersey, have invented an Improvement in Snap-Hooks, of which the following is a specification.

Snap-hooks have been made with a spring to close the hook and retain the ring of the rim or strap. In cases where the spring is of metal it is liable to become obstructed by ice, so as not to move freely, and often it becomes bent or broken. Where rubber has been used, the snap-hook has been expensive and the rubber liable to become detached.
My snap-hook is especially adapted to double harness, where the snap-hook has to be connected and disconnected rapidly, as with car-horses; but said snap-hook may be used for any purpose to which it is applicable.
I make the shank portion of the hook with wings that are adapted to receive between them one portion of a cylindrical or prismatic plug of rubber, and to retain the same by bending the wings down upon the rubber, and the free end of the plug is adjacent to the end of the hook, so that it can be sprung aside to admit the insertion or withdrawal of the ring, and this is effected by pressure by or upon the ring itself, so that the connection or disconnection is very rapid, and the rubber retains the ring under the ordinary circumstances of use.

In the drawings, Figure 1 is an elevation of the snap-hook complete. Fig. 2 is a section at right angles to Fig. 1; and Fig. 3 is a section at the line *x x*, Fig. 2.

The snap-hook is usually made of malleable cast-iron, with a shank, A, having a hook, B, at one end and a loop or eye, C, at the other end. The shank A is recessed at one side and provided with the wings D, so that a socket is formed for the reception of one end of the rubber plug E, which plug is usually cylindrical; but it may be prismatic and either solid or partially tubular, and this plug is inserted into the socket between the wings D and firmly grasped by closing such wings upon the rubber by pinchers or any suitable tool. The free end of the rubber plug is in line with and adjacent to the end of the hook B, and it is sprung aside by pressure against the ring F, when such ring is passed into or withdrawn from the hook.

I claim as my invention—

1. The snap-hook having a hook, B, at one end and a loop or eye, C, at the other end, the shank A and wings D at one side of the shank, and a plug of rubber retained at one end between the wings, and the free end adjacent to the end of the hook B, substantially as set forth.

2. The combination, in a snap-hook, of the hook B, eye or loop C, and shank A in one piece, and wings at one side of the shank forming with such shank a recess, and a plug of rubber inserted at one end into such recess and the other end adjacent to the end of the hook B, substantially as set forth.

Signed by me this 15th day of August, 1888.

OSCAR V. BLAZIER.

Witnesses:
J. OAKLEY NODGEN,
WILLIAM A. CODDINGTON.